United States Patent [19]

Best Available Copy

Rand, Jr.

[11] E Re. 30,417

[45] Reissued Oct. 14, 1980

[54] FUEL SAVING APPARATUS FOR MULTIPLE CYLINDER INTERNAL COMBUSTION ENGINES

[76] Inventor: Earl W. Rand, Jr., 2101 Washington, Kansas City, Mo. 64108

[21] Appl. No.: 947,713

[22] Filed: Oct. 2, 1978

Related U.S. Patent Documents

Reissue of:

[64] Patent No.: 4,018,204
Issued: Apr. 19, 1977
Appl. No.: 646,361
Filed: Jan. 2, 1976

[51] Int. Cl.[3] ..... F02D 9/00

[52] U.S. Cl. ..... 123/198 F; 123/124 R; 123/169 V

[58] Field of Search ..... 123/198 F, 198 R, 119 P, 123/124 R, 169 V

[56] References Cited

U.S. PATENT DOCUMENTS

| | | | |
|---|---|---|---|
| 1,812,709 | 6/1931 | Odee et al. | 123/169 V |
| 2,444,440 | 7/1948 | Grieshaber et al. | 123/198 F |
| 2,490,646 | 12/1949 | Murphy et al. | 123/169 V |
| 2,625,921 | 1/1953 | Van Ry | 123/169 V |
| 2,708,428 | 5/1955 | Fisher | 123/169 V |
| 3,204,139 | 8/1965 | Candelise | 123/169 V |
| 3,400,702 | 9/1968 | Watkins | 123/198 F |

FOREIGN PATENT DOCUMENTS 5712 3/1949 United Kingdom .

*Primary Examiner*—Ira S. Lazarus
*Attorney, Agent, or Firm*—Fishburn, Gold and Litman

[57] ABSTRACT

Fuel saving apparatus for controlling the supply of fuel to one or more selected cylinders of a multi-cylinder internal combustion engine comprises a remotely and independently controlled fuel saving valve operably positioned to provide selective communication between the cylinder clearance volume and a filtered air portion of the engine carburetor. The valve is closed for normal, full power engine operation, and open for predetermined low engine power demand periods. The opening of said valve so severely reduces cylinder intake vacuum and resultant air-fuel influx as to render temporarily ineffective the cylinder, thereby reducing engine fuel consumption.

10 Claims, 4 Drawing Figures

FUEL SAVING APPARATUS FOR MULTIPLE CYLINDER INTERNAL COMBUSTION ENGINES

Matter enclosed in heavy brackets [ ] appears in the original patent but forms no part of this reissue specification; matter printed in italics indicates the additions made by reissue.

This invention relates to multi-cylinder internal combustion engines and in particular to means for rendering ineffective selected cylinders during low engine power demand periods, thereby reducing engine fuel consumption.

The multi-cylinder internal combustion engine, such as the spark ignition piston engine commonly used in automobiles, is normally operated with fuel supplied to each of the several engine cylinders. Considerable economies can be realized however by split engine operation, such as operating an eight cylinder engine on four cylinders, under low and moderate load conditions. This economy is a result of the well known fact that individual cylinder efficiency is increased, up to an optimum point, when operating cylinder load is increased.

Split engine operation has long been recognized as a theoretically desirable goal. However, the general complexity of mechanisms which have been developed to achieve this type of operation have thus far precluded its commercial feasibility. The present invention relates to a greatly simplified split engine control system which is particularly efficient and reliable in operation.

The principal objects of the present invention are: to provide a fuel saving valve member operably connected with at least one cylinder of a multiple cylinder internal combustion engine for breaking engine intake vacuum and air-fuel influx so as to render temporarily ineffective said one cylinder; to provide such an apparatus wherein a valve member first end is operably connected to the one cylinder clearance volume and a valve member second end is adapted for connection with a filtered air portion of an engine carburetor so as to further reduce fuel consumption; to provide such an apparatus wherein an elongated, tubular body member is connected with said valve member to facilitate the installation of said device in existing multiple cylinder internal combustion engines; to provide such an apparatus wherein the body member includes an internal water jacket cavity to increase the operating life of said apparatus; to provide such an apparatus wherein vacuum means remotely and independently operate said valve member; and to provide such an apparatus which is economical to manufacture, and particularly well adapted for the proposed use.

Other objects and advantages of this invention will become apparent from the following description taken in connection with the accompanying drawings wherein are set forth, by way of illustration and example, certain embodiments of this invention.

The drawings constitute a part of this specification and include exemplary embodiments of the present invention and illustrate various objects and features thereof.

Figure 1:
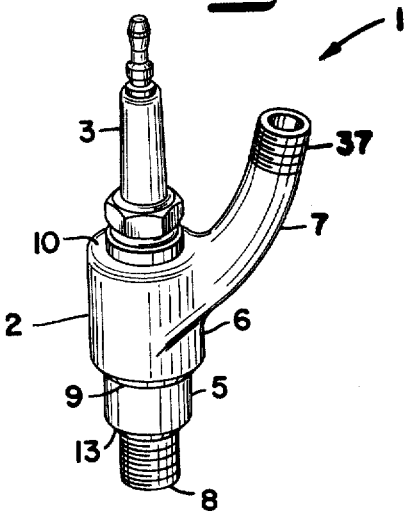
FIG. 1 is a perspective view of a fuel saving apparatus body member, embodying the present invention, showing a spark plug engaged therein.
Figure 2:
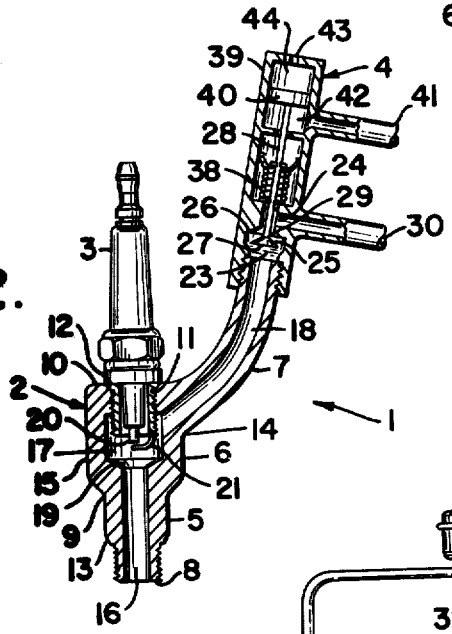
FIG. 2 is a vertical cross-sectional view of the fuel saving apparatus, particularly showing the body and valve members thereof.

Referring more in detail to the drawings:

The reference numeral 1 generally designates a fuel saving apparatus embodying the present invention and comprising a body member 2 adapted to receive a spark plug 3 therein and a valve member 4. The body member 2 is an elongated tubular structure which, as illustrated in FIGS. 1 and 2, includes respectively interconnected tubular portions 5, 6 and 7. The free end 8 of the body first portion 5 is externally threaded and adapted for sealing engagement within an engine spark plug aperture (not shown). The other end 9 of the first body portion is rigidly attached to the diametrically larger second portion 6. The second portion 6 includes a free end 10 with a central, internally threaded aperture 11 therethrough, adapted for sealingly receiving and engaging therein a spark plug 3. In this example, the free end 8 and the aperture 11 are of the same diameter and thread design such that the spark plug removed from the selected cylinder can be engaged in aperture 11 and used therewith. The aperture 11 has an inclined, countersunk surface 12 to form a washerless, positive seal with the spark plug 3. A similar surface 13 is provided on the first body portion 5 for engagement with the engine spark plug aperture. The third body portion 7 is a tubular structure having one end 14 connected with the side wall 15 of the second body portion 6. Each body portion 5, 6, and 7 respectively includes a central aperture 16, 17, and 18 which are mutually interconnected and form a body member cavity 19 through which engine gases are transmitted. The central and peripheral spark plug electrodes 20 and 21 are centrally disposed within the body cavity 19, which is tapered at the intersection of apertures 16 and 17 to promote flame propagation therethrough. Preferably, body member 2 is adapted to minimize the distance between the electrode 21 and the free end 8 to promote spark plug cooling and to extend its useful life. The body member 2 is, in this example, constructed of a high-strength, heat-resistant material such as stainless steel, and, if desired, cooling fins (not shown) may be added to the exterior surface.

The valve member 4 has a first, innermost end 23, a second, outermost end 24, a frustoconical valve 25, and mating valve seat 26. The larger, circular surface 27 of the valve 25 is disposed inwardlymost of the body member to assure the proper seating thereof during high body cavity pressures. A valve stem 28 has one end 29 thereof attached to said valve 25 for translating same relative to the valve seat 26. A tube 30 is attached to the valve end 24 and has connection or communication with a manifold 31 which is in turn connected with a filtered air portion of an engine carburetor. In the illustrated structure, (FIG. 4) a filtered air portion 32 is disposed between an air filter 34 and a carburetor venturi 35. The innermost valve end 23 is internally threaded to mate with a threaded portion 37 of the body third portion 7. In this example, the valve 25 is resiliently retained in a normally closed position by a compressed coil spring 38 which surrounds a portion of the valve stem 28. The valve 25 is automatically manipulated by means such as an electric solenoid (not shown) or the illustrated vacuum cylinder 39 and piston 40, which is attached to an outwardly positioned end of the valve stem 28. A vacuum tube 41 communicates with the cavity 42 of the cylinder 39 below the piston 40 and a vent aperture 43 is disposed through the cylinder wall above the piston 40.

Figure 3:
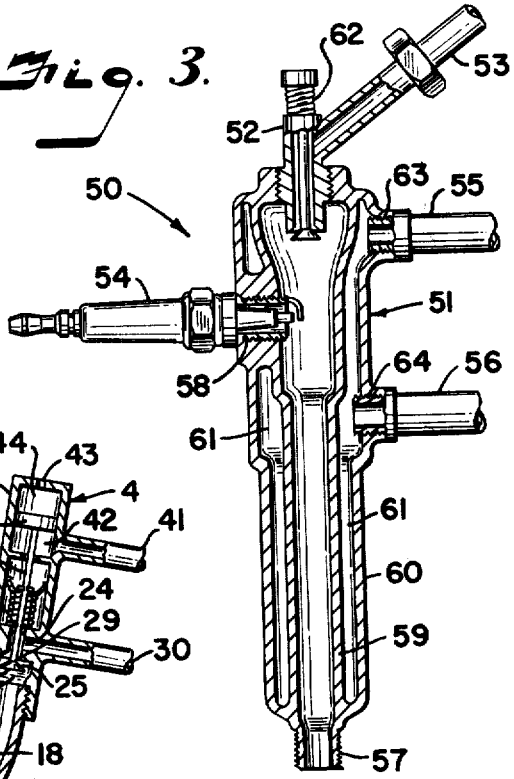
FIG. 3 is a vertical cross-sectional view of a second embodiment of the present invention, which includes a water jacket cavity.

The reference numeral 50 generally designates a second embodiment of the present invention which is illustrated in FIG. 3 and includes a tubular body member 31, a valve member 52, a manifold tube 53, a spark plug 54, and fluid hoses 55 and 56. Like the previously described embodiment of the present invention, the body member 51 has a threaded end 57 adapted for engaging an engine spark plug aperture (not shown), and an internally threaded aperture 58 adapted to receive the spark plug 54 therein. Body member 51 includes inner and outer spaced-apart side walls 59 and 60 which form a fluid cavity 61 therebetween. In the illustrated structure, the valve member 52 is manually operable and assumes, by virtue of a helical spring 62 a normally closed position. First and second internally threaded apertures 63 and 64 are disposed through the outer side walls 60, extend into the fluid cavity 61, and respectively have connection with the fluid hoses 55 and 56.

Figure 4:
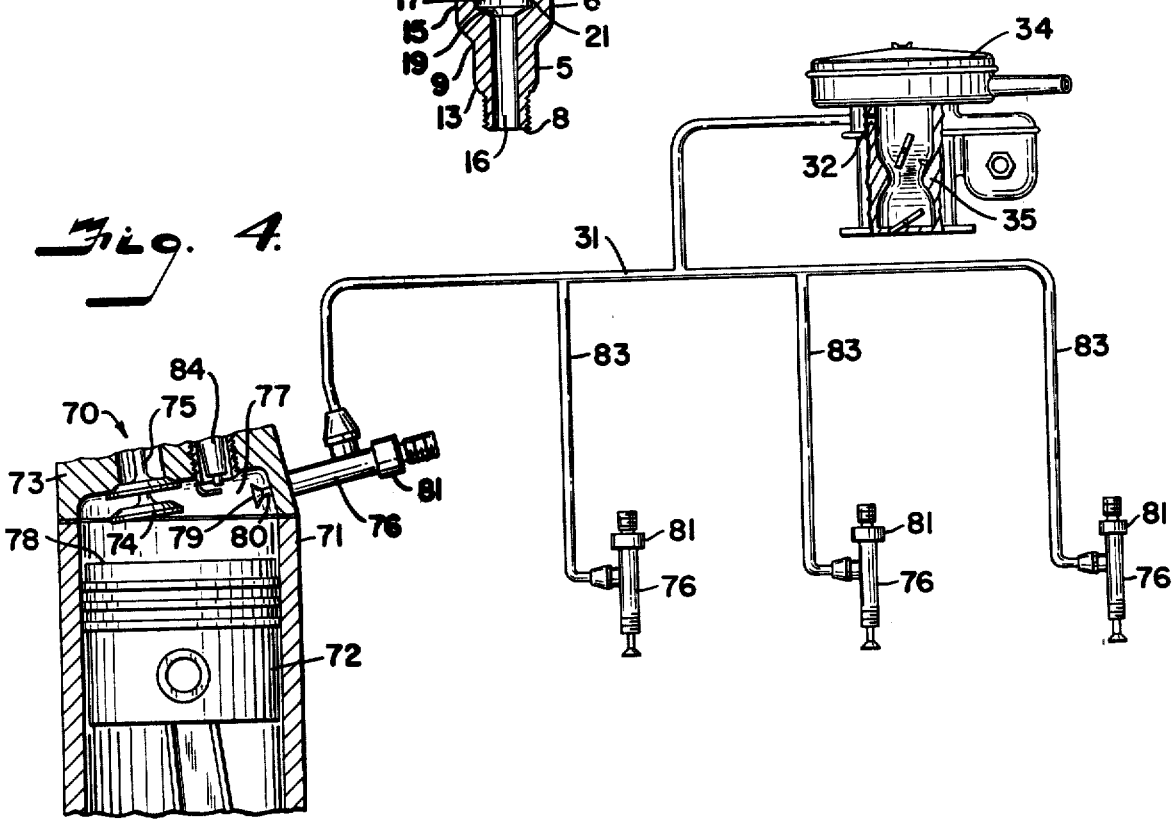
FIG. 4 is a schematic representation of a third embodiment of the present invention, in the form of a multi-cylinder internal combustion engine for split operation.

A third embodiment of the present invention, illustrated in FIG. 4, is a multi-cylinder internal combustion engine 70 including a typical deactivatable cylinder 71, a piston 72, a valve head 73, an intake valve 74 and an exhaust valve 75. The fuel saving valve 76 is disposed in a clearance volume 77 of the cylinder, defined as that volume of the cylinder above the upper surface 78 of the piston in a top dead center position. A frustoconical valve 79 attached to valve stem 80 is reciprocatingly manipulated by suitable power means such as vacuum device 81. In the illustrated embodiment, four fuel saving valves 76 are displayed, only one of which is shown in conjunction with a cylinder. Each valve 76 is provided with a tube 83 having connection with manifold 31.

The first and second embodiments 1 and 50 of the present invention are adapted to be installed in conventional multi-cylinder engines. The installer first removes the spark plug from those selected cylinders in which the apparatus is to be used. In a typical V-8 engine, those four cylinders having mutual connection with one side of the intake manifold are preferably selected for engagement with the fuel saving apparatus. The threaded end portion 8 and 57 respectively of embodiment 1 and 50 is threadingly engaged with the spark plug aperture of the selected cylinders. The removed spark plugs are then reinstalled into apparatus threaded aperture 11 or 58. The valve member is then attached to each fuel saving device and the manifold tube 30 or 53 of each valve is interconnected to manifold 31. For remote vacuum valve operation, the vacuum tube 41 is attached to each cylinder mechanism 39. In valve embodiment 50, inlet and outlet hoses 56 and 55 respectively are attached to the engine's cooling system such as through the heater hoses thereof.

In use, the fuel saving valve is closed for full engine power operation, such as during vehicle acceleration. When closed, the valve seals the cylinder's combustion chamber and enables same to function in a normal manner. During predetermined low engine power demand periods, for example in the course of constant speed travel over substantially level expressways, the operator (or a suitable control device responding to operational conditions) opens the fuel saving valves for split engine operation. The vacuum normally created in the cylinder during the piston's intake stroke is severely reduced as the cylinder draws in gases from the manifold which are under substantially atmospheric pressure. Although the intake valve 74 is also in an open position during the intake stroke, only a minimal volume of air-fuel mixture is drawn therethrough. During the compression stroke, although both the intake and exhaust valves 74 and 75 are in a closed position, the gases within the cylinder are not appreciably compressed, but rather are simply displaced through the valve into manifold 31. Because these cylinder gases lack the proper fuel content and degree of compression, they will not burn when excited by the spark plug 84, thereby rendering ineffective the selected cylinders. In order to achieve increased efficiency, that small volume of air-fuel mixture drawn into the inoperative cylinders during the intake stroke is carried through the manifold to the carburetor intake 32 for recycled use therein. The user (or control noted above) may, by activating the vacuum means 81, once again close the selected valves and thereby immediately achieve full power operation for passing or intown driving.

It is to be understood that the above-described arrangement may be applicable to diesel type engines also, but would require separate fuel shut-off to the inactivated cylinders.

It is to be further understood that while certain forms of this invention have been illustrated and described, it is not to be limited to the specific form or arrangement of parts herein described and shown, except insofar as such limitations are included in the following claims.

What I claim and desire to secure by Letters Patent is:

1. A fuel saving apparatus for multiple cylinder spark ignition internal combustion engines having a carburetor filtered air portion, said apparatus comprising:

a. an elongated tubular body member including an externally threaded first body portion adapted for sealing engagement within an engine cylinder spark plug aperture;

b. an apertured second body portion being internally threaded and adapted for sealingly receiving and engaging therein a spark plug;

c. a third body portion disposed adjacent said second body portion and including an aperture therethrough;

d. said body member including a central longitudinal aperture interconnecting the first, second and third body portions; and e. a valve member in said third body portion and adapted to move between an open and a closed condition respectively for opening and closing said third body portion aperture, said valve member having first and second ends; said valve member first end being sealingly attached to said third body portion about the aperture therein; said valve member second end being adapted for connection with said filtered air portion; said valve member, in said open condition causing cylinder intake vacuum to be reduced to the extent that an engine cylinder having connection therewith is rendered temporarily ineffective and engine fuel consumption is thereby reduced.

2. Apparatus as set forth in claim 1 wherein:

a. said body member includes inner and outer side walls;

b. a water jacket cavity is formed between said inner and outer side walls and is adapted to contain fluid therein for cooling said body member; and c. said body member outer wall has inlet and outlet apertures therethrough; said inlet and outlet apertures having connection with said water jacket cavity and being adapted for connection with a flowing coolant fluid system of said engine.

3. Apparatus as set forth in claim 1 including:

a. a cylindrical valve tube for facilitating the engagement of said apparatus and said engine spark plug aperture; said valve tube having a first end thereof sealingly attached to said third body portion about the aperture therein;

b. said valve tube extending opposingly from the first body portion and at an oblique angle to a body central axis; and c. a valve tube second end having connection with said valve member first end.

4. Apparatus as set forth in claim 1 wherein:

a. means for remotely operating said valve member are operably attached thereto for opening and closing said third body portion aperture.

5. Apparatus as set forth in claim 4 wherein:

a. said valve member comprises a valve and a mating valve seat;

b. a valve stem having a first end thereof attached to said valve for translating said valve relative to said valve seat, said valve stem having a second end thereof connected with said operating means; and c. operating means comprises a vacuum controlled piston.

6. Apparatus as set forth in claim 1 wherein:

a. said valve member comprises a frustoconical valve and mating valve seat; and b. the larger surface of said valve is disposed inwardlymost of said body member.

7. In a multiple cylinder internal combustion engine including a carburetor and a plurality of cylinders each of which has a piston, said cylinders respectively forming a combustion chamber clearance volume above said respective pistons, and an intake and exhaust valve associated with said respective cylinders, the improvement of *a device rendering temporarily ineffective selected engine cylinders during low engine power demand periods for reducing fuel consumption, said device comprising:*

(a) an independently controlled fuel saving third valve member operably associated with at least one of the cylinders [and adapted to selectively] *so as to* provide communication between said clearance volume and the atmosphere *during the low engine demand periods;*

(b) said third valve member, when open, severely reducing cylinder intake vacuum and resultant air-fuel influx to the extent that said one cylinder is rendered temporarily ineffective *during the low engine demand periods,* thereby reducing engine fuel consumption.

8. The improvement as set forth in claim 7 wherein:

a. said third valve member communicates with said carburetor whereby exhaust from said third valve member is introduced into said carburetor.

9. A multiple cylinder internal combustion engine as set forth in claim 7 wherein:

a. each of said cylinders includes a spark plug aperture and a spark plug;

b. said third valve member comprises a tubular body including an externally threaded first body portion removably and sealingly engaging said spark plug aperture;

c. an apertured second body portion is internally threaded and removably and sealingly receives and engages therein a spark plug;

d. an apertured third body portion disposed adjacent said second body portion;

e. said body member includes a central longitudinal aperture interconnecting the first, second and third body portion; and f. a valve member for opening and closing said third body portion aperture and having first and second ends; said valve member first end being sealingly attached to said third body portion about the aperture therein; said valve member second end having connection with said carburetor.

10. A multiple cylinder internal combustion engine as set forth in claim 9 including:

a. a cylindrical valve tube for facilitating the engagement of said fuel saving third valve and said engine spark plug aperture; said valve tube having a first end thereof sealingly attached to said third body portion about the aperture therein;

b. said valve tube extending opposingly from the first body portion and at an oblique angle to a body central axis; and c. a valve tube second end having connection with said valve member first end.

* * * * *